US012658685B2

(12) United States Patent
ALshammari et al.

(10) Patent No.: US 12,658,685 B2
(45) Date of Patent: Jun. 16, 2026

(54) NONMETALLIC DUCT BANK WITH NONMETALLIC SUBDUCTS

(71) Applicant: SAUDI ARABIAN OIL COMPANY, Dhahran (SA)

(72) Inventors: Hajhouj Fahad ALshammari, Dhahran (SA); Hamad Tawfeeq Alsharhan, Dhahran (SA); Abdullah F. Almuways, Dhahran (SA); Haitham A. Alarfaj, Dhahran (SA); Mirza Mansoor Baig, Dhahran (SA); Md Anwar Parvez, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 254 days.

(21) Appl. No.: 18/191,133

(22) Filed: Mar. 28, 2023

(65) Prior Publication Data

US 2024/0332939 A1 Oct. 3, 2024

(51) Int. Cl.
H02G 9/06 (2006.01)
F16L 3/23 (2006.01)
(Continued)

(52) U.S. Cl.
CPC .................. H02G 9/04 (2013.01); F16L 3/23 (2013.01); F16L 3/26 (2013.01); H02G 9/06 (2013.01); H02G 3/06 (2013.01)

(58) Field of Classification Search
CPC .... H02G 9/04; H02G 3/06; H02G 9/06; F16L 3/23; F16L 3/26
See application file for complete search history.

(56) References Cited

U.S. PATENT DOCUMENTS

| | | | | | |
|---|---|---|---|---|---|
| 1,817,772 A | * | 8/1931 | Sipe | .......................... | H02G 3/06 174/79 |
| 3,783,434 A | * | 1/1974 | Ransford, III | ......... | H01R 13/53 439/578 |

(Continued)

FOREIGN PATENT DOCUMENTS

| | | |
|---|---|---|
| CA | 3060184 C | 7/2020 |
| CN | 108005208 A | 5/2018 |

(Continued)

OTHER PUBLICATIONS

International Search Report and Written Opinion Issued in Corresponding PCT Application No. PCT/US2024/021739, Mailed on Jul. 19, 2024, 14 pages.

*Primary Examiner* — Brent W Herring
(74) *Attorney, Agent, or Firm* — Osha Bergman Watanabe & Burton LLP

(57) ABSTRACT

A duct bank for enclosing utility lines underground includes a first main duct formed from a nonmetallic material. The first main duct defines an interior volume therewithin and has a circular cross-sectional shape. The duct bank further includes a plurality of sub-ducts each formed from a nonmetallic material and being disposed in the interior volume of the first main duct. Each of the plurality of sub-ducts has a circular cross-sectional shape and is configured to carry one or more utility lines. The nonmetallic material of the first main duct includes one or more of: glass reinforced polyester (GRP), a hybrid fiber-reinforced epoxy-based laminate, or glass-reinforced vinyl ester. The nonmetallic material of each of the plurality of sub-ducts includes one or more of: GR, high-density polyethylene (HDPE), or polyvinyl chloride (PVC).

17 Claims, 3 Drawing Sheets

(51) Int. Cl.
| | |
|---|---|
| *F16L 3/26* | (2006.01) |
| *H02G 9/04* | (2006.01) |
| *H02G 3/06* | (2006.01) |

(56) References Cited

U.S. PATENT DOCUMENTS

| | | | | |
|---|---|---|---|---|
| 4,059,296 A * | 11/1977 | Panourgias | ............. | F16L 37/18 |
| | | | | 285/423 |
| 4,319,950 A * | 3/1982 | Sznopek | ................ | F16L 17/04 |
| | | | | 425/469 |
| 4,329,193 A * | 5/1982 | Sznopek | ................ | F16L 17/04 |
| | | | | 285/423 |
| 5,078,432 A | 1/1992 | Seiter | | |
| 5,463,187 A | 10/1995 | Battle | | |
| 5,474,207 A * | 12/1995 | Nouhra | ................ | B65D 88/10 |
| | | | | 220/653 |
| 5,605,419 A | 2/1997 | Reinert, Sr. | | |
| 6,774,311 B1 | 8/2004 | Byun | | |
| 7,202,418 B2 * | 4/2007 | Glew | .................... | H01B 13/06 |
| | | | | 174/113 C |
| 8,991,485 B2 | 3/2015 | Chenault et al. | | |
| 10,566,111 B2 * | 2/2020 | Glew | .................... | H01B 13/06 |
| 12,013,067 B2 * | 6/2024 | Cobb | ................. | H02G 3/0468 |

| | | | | |
|---|---|---|---|---|
| 2005/0013566 A1 * | 1/2005 | Storaasli | .................. | H02G 9/04 |
| | | | | 385/113 |
| 2005/0199415 A1 * | 9/2005 | Glew | ................... | G02B 6/4429 |
| | | | | 174/113 C |
| 2008/0150279 A1 * | 6/2008 | Statham | .................... | F16L 5/10 |
| | | | | 285/291.1 |
| 2008/0279635 A1 | 11/2008 | McCoy | | |
| 2010/0164221 A1 * | 7/2010 | Rinderhofer | ........... | F16L 47/08 |
| | | | | 285/24 |
| 2013/0199654 A1 * | 8/2013 | Jeon | .......................... | F16L 9/19 |
| | | | | 138/111 |
| 2018/0010311 A1 * | 1/2018 | Harris | ...................... | E02B 9/06 |

FOREIGN PATENT DOCUMENTS

| | | | | | |
|---|---|---|---|---|---|
| CN | 110797827 A | 2/2020 | | | |
| EP | 2423559 A1 | 2/2012 | | | |
| EP | 2557345 A2 | 2/2013 | | | |
| ES | 2656775 A1 | 2/2018 | | | |
| FR | 2704697 A1 | 11/1994 | | | |
| JP | H10299954 A | 11/1998 | | | |
| JP | H10299955 A | 11/1998 | | | |
| JP | 2000152477 A | 5/2000 | | | |
| JP | 2019134623 A | 8/2019 | | | |
| KR | 102507178 B1 * | 3/2023 | .............. | H02G 9/06 |
| WO | 2015088949 A1 | 6/2015 | | | |

* cited by examiner

NONMETALLIC DUCT BANK WITH NONMETALLIC SUBDUCTS

BACKGROUND

In industrial and residential settings alike, utility lines such as pipes (for water, natural gas, etc.) and cables (for electricity, telephone landlines, fiberoptic, etc.) often need to cross roadways and footways, including, for example, primary roads, secondary roads, access roads, sidewalks, footpaths, and bicycle paths. If utility lines cross underneath roadways and footways, normally a rudimentary duct or encasement may be provided around the utility lines, which may then be covered with a roadway or footway using customary roadway or footway construction processes.

Duct banks typically include two or more ducts within a common, surrounding or encasing structure, for the purpose of carrying utility lines, including cables. Generally, the surrounding/encasing structure is often formed from concrete and a number of ducts carrying cables or other utility lines are typically embedded therein. Ground water disturbance often leads to corrosion, and project schedules are often impacted given the considerable time commitment required for pouring and curing the concrete. Measures for avoiding or mitigating disadvantages such as these continue to remain elusive.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a duct bank for enclosing utility lines underground. The duct bank includes a first main duct formed from a nonmetallic material and defining an interior volume therewithin, the first main duct having a circular cross-sectional shape. The duct bank further includes a plurality of sub-ducts each formed from a nonmetallic material and being disposed in the interior volume of the first main duct. Each of the plurality of sub-ducts has a circular cross-sectional shape and is configured to carry one or more utility lines. The nonmetallic material of the first main duct includes one or more of: glass reinforced polyester (GRP), a hybrid fiber-reinforced epoxy-based laminate, or glass-reinforced vinyl ester. The nonmetallic material of each of the plurality of sub-ducts includes one or more of: GR, high-density polyethylene (HDPE), or polyvinyl chloride (PVC).

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Figure 1:
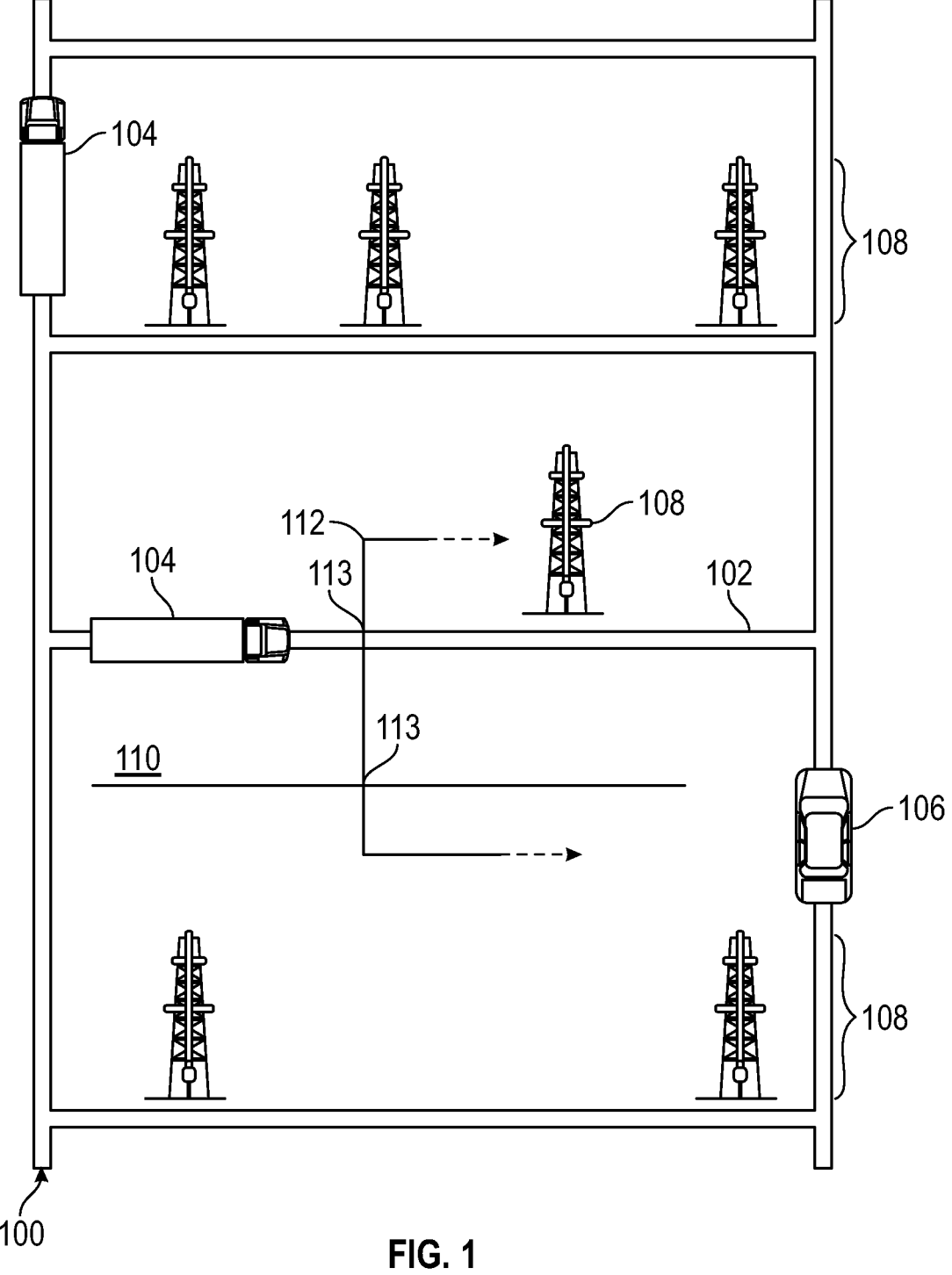
FIG. 1 schematically illustrates a road grid at an industrial site where duct banks are installed, in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Broadly contemplated herein, in accordance with one or more embodiments, are non-metallic heavy duty duct banks that including non-metallic sub-ducts for accommodating utility lines. Particularly, and merely by way of example, the sub-ducts may accommodate low, medium and high voltage electrical power, control and instrumentation cables for underground installations.

In accordance with one or more embodiments, a relatively lightweight nonmetallic structure is provided. The structure is of significant structural strength and can be used for a great variety of underground installations, including under road crossings and via longer, direct buried routes. Additionally, the structure is very easy and cost-efficient to install, accompanied by a great reduction in carbon dioxide emissions.

Turning now to the figures, to facilitate easier reference when describing FIGS. 1 through 4, reference numerals may be advanced by a multiple of 100 in indicating a similar or analogous component or element among FIGS. 1-4.

By way of a working example in accordance with one or more embodiments, FIG. 1 schematically illustrates a road grid at an industrial site where one or more duct banks may be installed. As shown, a road grid (or road network/arrangement) 100 may include a number of roadways 102 that may be considered primary roads, secondary roads, or access roads (in descending order of projected volumes of traffic), traversable by vehicles such as trucks 104 and cars 106. Roadways 102 may be paved or unpaved. If paved, roadways may include an upper road surface for accommodating vehicular traffic, where the upper road surface may be formed of concrete, asphalt, stone, paving bricks, or the like. By way of illustrative example, the industrial site may include oil well sites, including oil rigs 108, that are distributed along various roadways 102 of the road grid 100. There may also be included one or more footways 110 which accommodate pedestrian or light (e.g., non-motorized) vehicular traffic. For instance, a footway 110 may be a sidewalk near or adjacent a roadway 102, or may be a dedicated (paved or unpaved) footpath and/or bicycle path.

In accordance with one or more embodiments, particular locations at the industrial site (e.g., oil well sites 108), are typically accessed by utility lines including cables and pipes for electricity, landline telephonic communication, water, gas, etc. In order for utility lines to be safely led through the site, they may be disposed in duct banks 112 that run underground through the site and cross under roadways 102 and footways 110 at crossing points 113. For example, one or more duct banks 112 holding one or more sub-ducts (themselves carrying utility lines) may be installed in a dugout trench, which may then be covered with materials for constructing the roadway 102 or footway 110.

It should be understood that FIG. 1 is provided merely as an illustrative example of a possible application of embodiments as broadly described and contemplated herein. Thus, in accordance with one or more embodiments, it is conceivable to install duct banks as contemplated herein under roadways and footways at other possible types of industrial sites, or even at any of a great variety of possible residential sites. Additionally, the duct banks may be installed underground essentially anywhere suitable or expedient.

Figure 2:
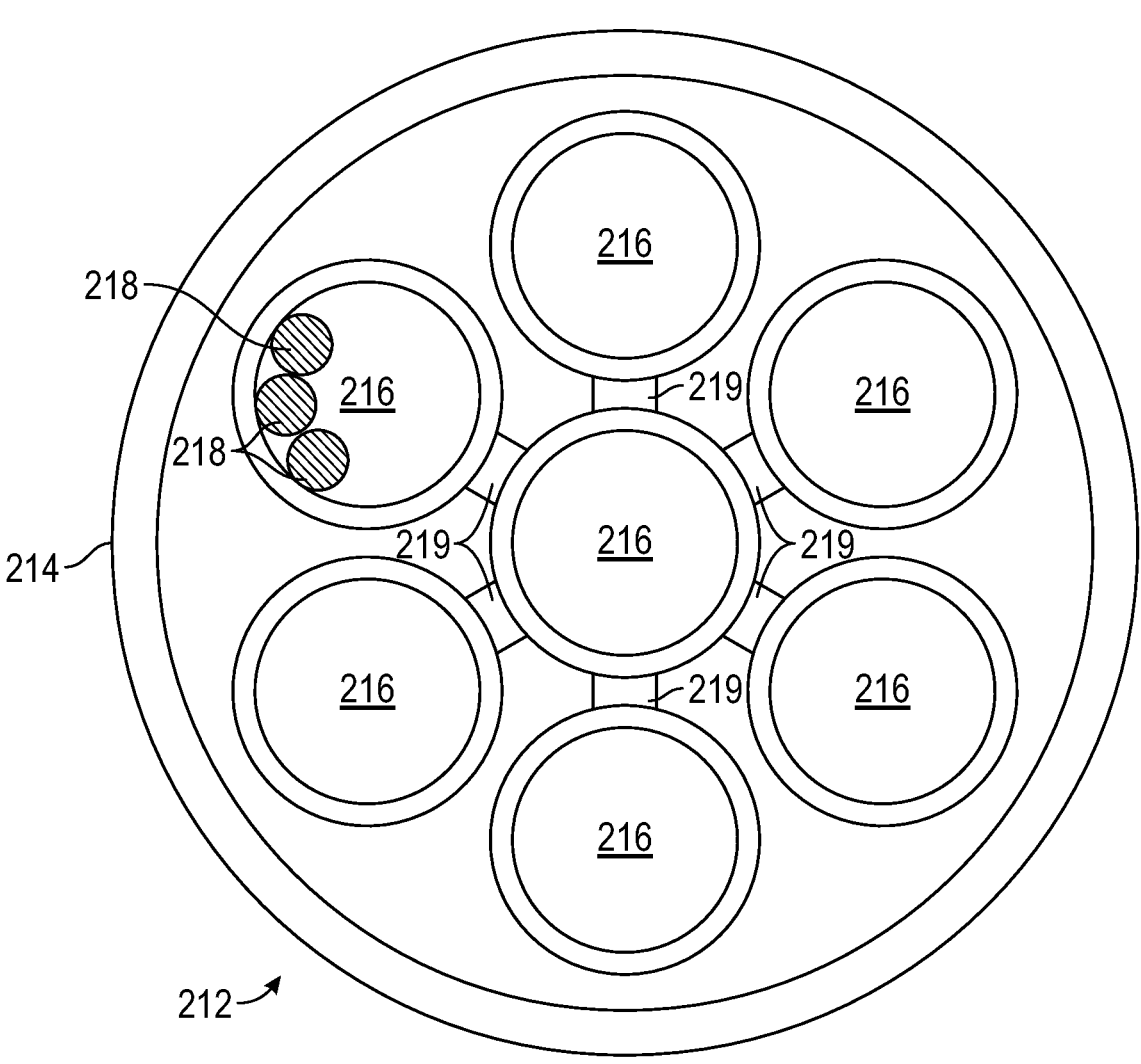
FIG. 2 is a schematic, elevational cross-sectional view of a duct bank in accordance with one or more embodiments.

FIG. 2 is a schematic, elevational cross-sectional view of a duct bank 212 in accordance with one or more embodiments. As shown, duct bank 212 may include a main duct 214 with a plurality of sub-ducts 216 running through an interior volume of the main duct 214. As shown by way of illustrative example with respect to one of the sub-ducts 216, each sub-duct 216 may carry one or more utility lines; three cables 218 are illustrated here in particular. Generally, the sub-ducts 216 may be configured to carry low, medium and high voltage electrical power lines or control or instrumentation cables; thus, the cables 218 illustrated may be considered to represent at least any of these types of lines or cables. Generally, different lines or cables may be carried by different sub-ducts 216, especially to mitigate potential adverse effects deriving from imbalances in heat transfer between different types of lines or cables.

In accordance with one or more embodiments, a plurality of spacers 219 may be provided to interconnect sub-ducts 216 and to maintain a predetermined clearance between neighboring pairs of sub-ducts 216. Thus, in the working example illustrated, there are seven sub-ducts 216 wherein six sub-ducts 216 are disposed at regular angular intervals about a central one of the sub-ducts 216. Six spacers 219 thus are disposed between the central one of the sub-ducts 216 and each of the six surrounding sub-ducts 216. Though only one possible implementation is shown in FIG. 2, it should be understood that a wide variety of other implementations are possible. For instance, five additional spacers 219 could be provided between neighboring pairs of the six outer sub-ducts 216, for a total of eleven spacers 219.

In accordance with one or more embodiments, With any implementation of sub-ducts 216 and spacers 219, an entire pre-assembled set of sub-ducts 216 may thus be provided, that can easily be installed as a single unit within the interior space of main duct 214. A clear attendant advantage is in forestalling individual sub-ducts 216 from physically interfering (e.g., collapsing) with respect to each other in response to external physical forces, as well as in mitigating potential effects of adverse effects deriving from imbalances in heat transfer between neighboring sub-ducts 216. The spacers 219 may be formed from any suitable material, and can be adhered to the sub-ducts 216 via any suitable method or even may be formed as integral extensions of sub-ducts 216. In accordance with a working implementation, the spacers 219 and sub-ducts 216 may all be formed from the same material.

In accordance with one or more embodiments, the main duct 214 may have a circular cross-sectional shape as shown and may be formed from glass-reinforced polymer such as GRP (glass reinforced polyester). Alternatively, the glass-reinforced polymer forming the main duct 214 may be a heavy duty hybrid fiber-reinforced epoxy-based laminate or from a glass reinforced vinyl ester. In any of these instances, the sub-ducts 216 may also each assume a circular cross-sectional shape and may be formed from PVC (polyvinyl chloride), HDPE (high-density polyethylene), GRP or a combination of any or all of these. As well, the sub-ducts 216 may be uniformly formed from the same material or combination of materials, or may each be formed from different materials or combinations of materials. Essentially, if the main duct 214 is formed from a material at least as strong as the one or more materials used for the sub-ducts 216, then the main duct 214 will serve as an additional form of protection for the sub-ducts 216 and the cables 218 or lines contained therein, e.g., against adverse environmental conditions such as water ingress or chemical or ultraviolet light infiltration.

In accordance with one or more embodiments, the main duct 214 and sub-ducts 216 may be dimensioned in any manner deemed suitable for the application at hand. By way of an illustrative and non-restrictive working example, limits on the size of main duct 214 need only be governed by manufacturing constraints thus, e.g., main duct 214 could have an outer diameter of between about 25 mm (millimeters) and about 4000 mm. The sub-ducts 216, for their part, could each have an outer diameter within the same general range if formed from GRP. Otherwise, the sub-ducts 216 could each have an outer diameter of between about 15 mm and 1500 mm if formed from HDPE and between about 15 mm and about 500 mm if formed from PVC. Generally, the dimensions of main duct 214 and sub-ducts 216 can be determined in view of code-based or application-related requirements, or both, and pursuant to mechanical tests that can confirm sufficient rigidity for any or all components involved.

In accordance with one or more embodiments, if the main duct 214 is formed from a heavy duty hybrid fiber-reinforced epoxy-based laminate, then different curing alternatives may be used. For instance, if one or more subducts 216 are intended to carry cables 218, an anhydride or amine curing system could be chose for the laminate, based on prospective cable temperatures.

In accordance with one or more embodiments, recycled carbon fiber may be used in manufacturing main duct 214. This can then impart a measure of conductivity that will facilitate traceability from above-ground. By way of an illustrative example, the majority of the main duct 214 can be formed from glass fiber (e.g., GRP) while an outermost portion may be formed to include carbon fiber.

Figure 3:
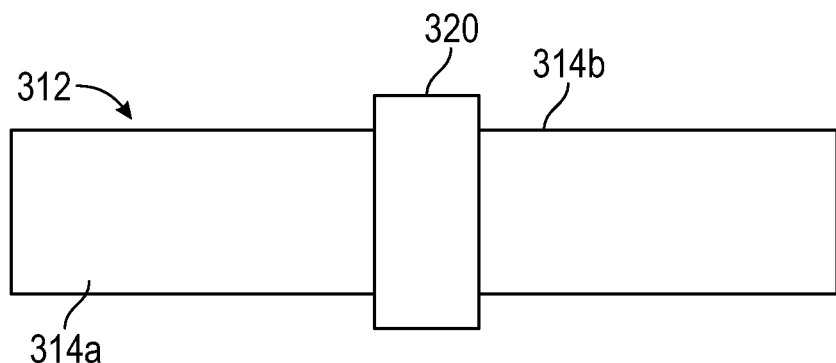
FIG. 3 schematically illustrates, in an elevational view, a working example of an arrangement for axially interconnecting two main ducts.

In accordance with one or more embodiments, multiple main ducts may be axially connected together in an end-to-end fashion. For example, FIG. 3 schematically illustrates, in an elevational view, a working example of an arrangement for axially interconnecting two main ducts 314a and 314b. Accordingly, for this purpose, a coupler 320 may be provided to interconnect an axial end of a first main duct 314a of duct bank 312 and an axial end of a second main duct 314b of duct bank 312. The coupler 320 is disposed radially outwardly of the first main duct and of the second main duct, may be embodied by a double-bell coupling and may be formed from the same material as main ducts 314a and 314b. Thus, by way of illustrative example, the two main ducts 314a/b and coupler 320 alike may be formed from GRP.

Figure 4:
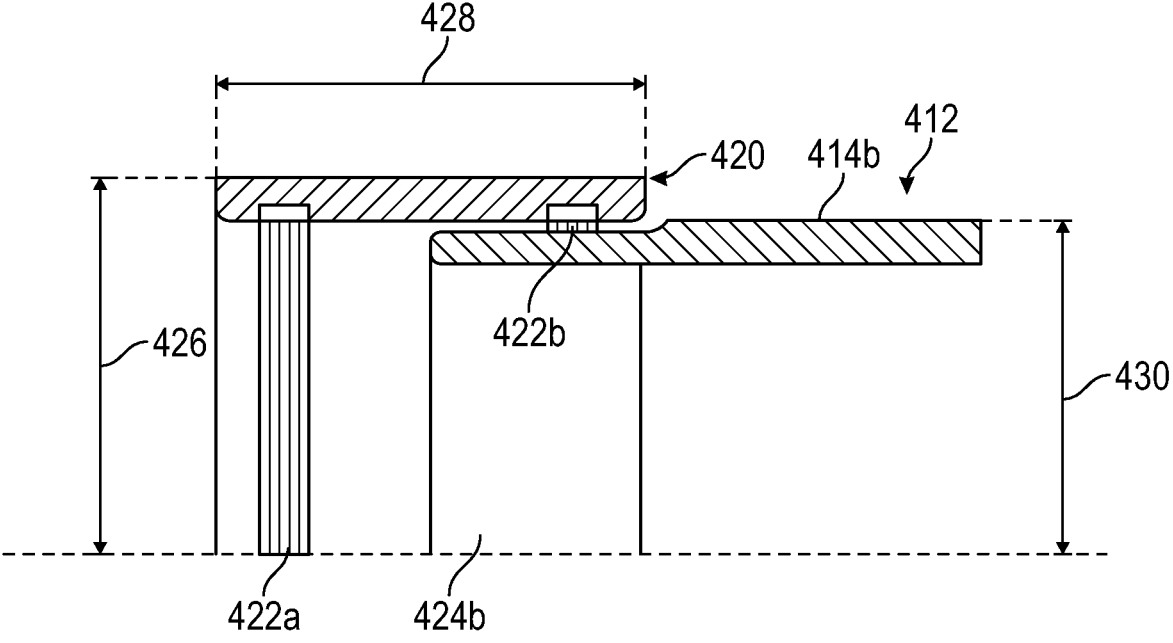
FIG. 4 is an elevational cross-sectional view of a coupler for interconnecting two main ducts.

In accordance with one or more embodiments, FIG. 4 is an elevational cross-sectional view of a coupler for inter- connecting two main ducts. Thus, coupler 420 may be embodied as a double-bell coupling which receives an axial end of a main duct 414b of a duct bank 412 and of another main duct not illustrated. As shown, coupler 420 may include elastomer or rubber bands of material 422a and 422b, each embedded or mounted at an interior surface of coupler 420 and extending about a full circumference of the interior surface. Each band 422a/b may be suitable com- posed and configured to accommodate and compress about a respective tapered end of a main duct; here, band 422b is shown as accommodating tapered end 424b of main duct 414b.

In accordance with one or more embodiments, illustrated dimension 426 represents half the outer diameter of coupler 420, 428 represents the axial length of coupler 420 and 430 represents half the diameter of the tapered end 424b of main duct 414b. Generally, dimension 426 will be governed by dimension 430 in a manner to ensure a close mutual radial fit, which may be an interference fit. Additionally, by way of an illustrative and non-restrictive example, axial length 428 may be between about 150 mm and 500 mm, and may essentially be governed by dimensions 426 and 430 in a manner to ensure a rigid connection between main duct 414b and another main duct.

Among clear advantages gained in accordance with one or more preferred embodiments, a duct bank as broadly con- templated herein is relatively light in weight, easy to install, largely impervious to corrosion and groundwater distur- bance, and enjoys a very long service life. Additionally, it permits greater design flexibility than conventional arrange- ments, involves a lower carbon footprint in manufacture, and utilizes a smoother underground bore that readily averts significant physical damage to the ducts and sub-ducts themselves. In comparison with conventional duct banks, it is readily utilized in seismic regions as well. A duct bank as broadly contemplated herein also accommodates bending or changes of direction for cables or utility lines much more readily, and largely precludes the need for any type of related external access, e.g., via manholes.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus- function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:
1. A duct bank for enclosing utility lines underground, the duct bank comprising:

a first main duct formed from a nonmetallic material and defining an interior volume therewithin, the first main duct having a circular cross-sectional shape; and a plurality of sub-ducts each formed from a nonmetallic material and being disposed in the interior volume of the first main duct;

each of the plurality of sub-ducts having a circular cross- sectional shape and being configured to carry one or more utility lines, wherein the nonmetallic material of the first main duct includes one or more of: glass reinforced polyester (GRP), a hybrid fiber-reinforced epoxy-based laminate, or glass-reinforced vinyl ester, wherein the nonmetallic material of each of the plurality of sub-ducts includes one or more of: GRP, high- density polyethylene (HDPE), or polyvinyl chloride (PVC);

a second main duct formed from the nonmetallic material of the first main duct and defining a second interior volume therewithin, the second main duct having a second circular cross-sectional shape;

the first and second main ducts each having an axial end; and a coupler that interconnects the axial end of the first main duct and the axial end of the second main duct, wherein the coupler is formed from GRP, wherein the coupler comprises a pair of elastomer or rubber bands that are embedded or mounted at an interior surface of the coupler and extend about a full circumference of the interior surface of the coupler.

2. The duct bank of claim 1, wherein each of the sub-ducts is configured to carry cables.

3. The duct bank of claim 2, wherein the sub-ducts are each formed from the same nonmetallic material.

4. The duct bank of claim 3, wherein:
one or more of the sub-ducts is configured to carry one or more power cables and one or more communication cables; and the duct bank further includes a plurality of spacers disposed between neighboring ones of the sub-ducts.

5. The duct bank of claim 4, wherein:
the plurality of sub-ducts extend between the interior volume of the first main duct and the interior volume of the second main duct; and the coupler is disposed radially outwardly of the first main duct and of the second main duct.

6. The duct bank of claim 5, wherein the coupler is a double-bell coupling.

7. The duct bank of claim 1, wherein the axial ends of each of the first and second main ducts are tapered.

8. The duct bank of claim 7, wherein the sub-ducts include a central sub-duct and a plurality of outer sub-ducts disposed at regular angular intervals about the central sub-duct.

9. The duct bank of claim 8, wherein the spacers extend between the central sub-duct and each of the outer sub-ducts.

10. The duct bank of claim 9, wherein the central sub- duct, outer sub-ducts and spacers form a single pre-as- sembled unit.

11. The duct bank of claim 10, wherein the spacers are formed from the same non-metallic material as the central sub-duct and outer sub-ducts.

12. The duct bank of claim 1, wherein the first main duct is formed from GRP.

13. The duct bank of claim 12, wherein the first main duct includes an outermost layer that includes carbon fiber.

14. The duct bank of claim 13, wherein the second main duct is formed from GRP.

15. The duct bank of claim 1, wherein the first main duct is formed from a hybrid fiber-reinforced epoxy-based laminate.

16. The duct bank of claim 15, wherein curing for the laminate is chosen based on prospective temperatures of the cables carried by the sub-ducts.

17. The duct bank of claim 16, wherein anhydride or amine curing for the laminate is chosen based on prospective temperatures of the cables carried by the sub-ducts.

* * * * *